US012018632B1

(12) United States Patent
Yuen et al.

(10) Patent No.: US 12,018,632 B1
(45) Date of Patent: Jun. 25, 2024

(54) AIR FILTER ASSEMBLY FOR CLEANING AN AIR STREAM FOR A COMMERCIAL VEHICLE

(71) Applicant: DEERE & COMPANY, Moline, IL (US)

(72) Inventors: Ming Parker Yuen, Heidelberg (DE); Alexander Berg, Mannheim (DE); Phouphadeth Sananikone, Ludwigshafen (DE); Silvia Janouschek, Sauerlach (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/557,104

(22) PCT Filed: Apr. 21, 2022

(86) PCT No.: PCT/EP2022/060601
§ 371 (c)(1),
(2) Date: Oct. 25, 2023

(87) PCT Pub. No.: WO2022/229002
PCT Pub. Date: Nov. 3, 2022

(30) Foreign Application Priority Data

Apr. 30, 2021 (DE) .......................... 102021111190.0

(51) Int. Cl.
*F02M 35/02* (2006.01)
*F02M 35/022* (2006.01)
(Continued)

(52) U.S. Cl.
CPC .... *F02M 35/0216* (2013.01); *F02M 35/0223* (2013.01); *F02M 35/0245* (2013.01);
(Continued)

(58) Field of Classification Search
CPC ........... F02M 35/0216; F02M 35/0223; F02M 35/0245; F02M 35/10104; F02M 35/10111; F02M 35/10137; F02M 35/164
See application file for complete search history.

(56) References Cited

U.S. PATENT DOCUMENTS

2016/0010604 A1* 1/2016 Zeilenga ............. F02M 35/164
95/12

FOREIGN PATENT DOCUMENTS

| | | | |
|---|---|---|---|
| EP | 3020954 | A2 | 5/2016 |
| GB | 2055719 | A1 | 3/1981 |
| WO | WO 2020187385 | A1 | 9/2020 |

OTHER PUBLICATIONS

The International Search Report and the Written Opinion of the International Searching Authority issued in application No. PCT/EP2022/060601, 5 pages.

* cited by examiner

*Primary Examiner* — Jacob M Amick
*Assistant Examiner* — Charles J Brauch

(57) ABSTRACT

The disclosure relates to an air filter assembly for cleaning an air stream for a commercial vehicle, including a pre-filter communicating with an air intake and a first fine filter which is provided downstream of the pre-filter in the direction of the air stream and, together with the pre-filter, is associated with an air filter part which extends vertically in a predetermined installation position. A redundant second fine filter, which is associated with an air filter part which extends horizontally in the predetermined installation position, follows the first fine filter in the direction of the air stream, the horizontally extending air filter part being a component of a syphon-like conduit region which rises in a curved manner in the direction of an air outlet, starting from the redundant second fine filter.

10 Claims, 2 Drawing Sheets

(51) Int. Cl.

*F02M 35/024* (2006.01)
*F02M 35/10* (2006.01)
*F02M 35/16* (2006.01)

(52) U.S. Cl.

CPC . *F02M 35/10104* (2013.01); *F02M 35/10111* (2013.01); *F02M 35/10137* (2013.01); *F02M 35/164* (2013.01)

AIR FILTER ASSEMBLY FOR CLEANING AN AIR STREAM FOR A COMMERCIAL VEHICLE

CROSS-REFERENCE TO RELATED APPLICATIONS

This application is a National Stage of PCT Application No. PCT/EP2022/060601, filed Apr. 21, 2022, which claims the benefit of and priority to German Patent Application No. 102021111190.0, filed Apr. 30, 2021, which are hereby incorporated by reference.

FIELD OF THE DISCLOSURE

The disclosure relates to an air filter assembly for cleaning an air stream for a commercial vehicle, in particular for an agricultural tractor.

BACKGROUND

Such multi-stage air filter assemblies are normally used in fields in which the ambient air has a considerable dust load. This is the case especially with commercial vehicles in the forestry and agricultural field, but also in the construction field. Here, the ambient air to be cleaned is typically supplied to an intake tract of a diesel-powered internal combustion engine.

SUMMARY

The individual filters are accommodated as cartridges which can be removed individually for maintenance and cleaning purposes in a common filter housing which is installed horizontally in the commercial vehicle. As a result, when the cartridges are removed, a situation is avoided in which dust particles entering the filter housing can pass unhindered into the downstream intake tract of the internal combustion engine. This risk would exist especially if the filter housing were installed upright.

Both the necessity of the horizontal installation and the accommodation of the individual filters in a common and thus comparatively bulky filter housing impede optimal use of the installation space available in the vehicle.

In view of this, the object of the present disclosure is to specify an air filter assembly of the type mentioned at the outset which is improved in terms of the use of the installation space typically available in a commercial vehicle.

This object is achieved by an air filter assembly having the features of one or more of the following embodiments.

The air filter assembly for cleaning an air stream for a commercial vehicle, in particular for an agricultural tractor, comprises a pre-filter, which communicates with an air inlet, and a first fine filter, which is provided downstream of the pre-filter in the direction of the air stream and, together with the pre-filter, is associated with an air filter portion which extends vertically in a predetermined installation position, wherein the first fine filter is followed in the direction of the air stream by a redundant second fine filter, which is associated with an air filter portion which extends horizontally in the predetermined installation position, wherein the horizontally extending air filter portion is part of a syphon-like line region which rises in a curved manner from the redundant second fine filter toward an air outlet.

In this way, a structurally divided arrangement of the pre-filter and the first fine filter on the one hand and the redundant second fine filter on the other hand is possible, wherein, when the redundant second filter is removed, the line region rising in a syphon-like manner prevents dust particles from being able to pass unhindered into the region behind the second filter in the direction of the air outlet.

The actual filtering of the air stream takes place via the pre-filter and the first fine filter, therefore these are arranged together directly following one another in the vertically extending air filter portion. The pre-filter and the first fine filter form the main filter of the air filter assembly. The redundant second fine filter, which is present for reasons of operational reliability, is an additional filter and can therefore be situated at a distance from the main filter in the following horizontally extending air filter portion. Such a structure takes account of the structural conditions prevailing in common commercial vehicles in the rural, forestry and construction machinery fields, since it is conceivable here, inter alia, to design the vertically extending air filter portion in the form of an intake snorkel situated outside an engine compartment, whereas the horizontally extending air filter portion can enter the engine compartment laterally in a region below an internal combustion engine. The use of an intake snorkel allows the distance between the air inlet and the ground to be increased and thus ambient air having a correspondingly lower dust load to be sucked in. As a result, the air filter assembly according to the disclosure therefore allows the installation space typically available in this respect in a commercial vehicle to be used better.

The installation position of the two air filter portions can be specified on the basis of an imaginary vehicle plane which is spanned by a first axis oriented substantially in the longitudinal direction of the commercial vehicle and a second axis oriented substantially in the transverse direction of the commercial vehicle. In relation to this vehicle plane, the vertically extending air filter portion is arranged upright and the horizontally extending air filter portion is arranged lying on the commercial vehicle.

Advantageous embodiments of the air filter assembly according to the disclosure can be found herein.

In some embodiments, the pre-filter is in the form of a centrifugal separator for separating out coarse particles present in the air stream sucked in. The centrifugal separator comprises a plurality of air inlets, which are adjoined by a respective individual separator which sets the air stream passing through in a swirling motion such that the coarse particles present therein are thrown into a collection region surrounding the individual separators owing to the centrifugal forces which arise.

In order to ensure consistent filter performance, it is possible for the collection region provided inside the centrifugal separator to communicate with a vacuum line for the continuous suction of the coarse particles separated out. The vacuum line can open here into an intake region on the low-pressure side of an axial fan assembly included in an engine cooling system or else can be connected to a separate vacuum generator.

Furthermore, it is conceivable for the vertically extending air filter portion to be connected to the horizontally extending air filter portion via a flexible bellows. The flexible bellows allows operation-induced movements and vibrations between the two portions to be compensated. The use of a flexible bellows also allows the vertically extending air filter portion to be attached to a driver's cab spring-suspended relative to a supporting vehicle chassis.

To this end, at least one fastening element can be provided on the vertically extending air filter portion for mounting on a supporting structure of the driver's cab of the commercial vehicle. The fastening element is for example a holder which is formed integrally on a plastic housing included in the air filter assembly.

Typically, the first fine filter comprises a folded filter nonwoven as the active filtering element. During operation, dust particles accumulate therein and can no longer be removed, even by way of cleaning, for example by being blown out with compressed air. To prevent degradation of the filter performance, the first fine filter can therefore be in the form of an exchangeable single-use filter cartridge.

For example, the single-use filter cartridge can also be equipped with an individual identification feature which can be detected by sensors and on the basis of which reuse of the single-use filter cartridge is excluded after a specified useful life has elapsed. The identification feature is for example an RFID tag, which can be read via an RFID receiver on the vehicle. The read identification feature is transmitted to a monitoring unit which determines, on the basis of an operating hour counter started for the single-use filter cartridge in question, whether the specified useful life is exceeded. If this is the case, the monitoring unit prevents the commercial vehicle from being put back into operation while outputting corresponding information for the driver.

The line region which rises in a curved manner can be in the form of an elastic air hose. This can include a heat-resistant rubber mixture, for example Viton. Any possible transmission of operation-induced movements of a vehicle unit attached thereto to the components of the vertically extending air filter portion can thus be largely excluded.

A fitting for connection to an intake tract of a vehicle unit in the form of an internal combustion engine is typically provided on the air outlet. The fitting can be formed directly on the elastic air hose as a part of the line region which rises in a curved manner. The fitting is for example mounted air-tightly via a hose clip on a connection flange of the internal combustion engine which communicates with the intake tract.

Finally, it should be noted that the use of the air filter assembly according to the disclosure does not have to be limited to the cleaning of an air stream to be supplied to an internal combustion engine. Rather, other applications in which reliable filtering of the ambient air is necessary can also be considered, for example in the case of the air-conditioning of a driver's cab which is hermetically sealed for protection from pesticides to be spread.

BRIEF DESCRIPTION OF THE DRAWINGS

The air filter assembly according to the disclosure for cleaning an air stream for a commercial vehicle is explained in more detail below with reference to the attached drawings. Here, identical reference signs relate to corresponding components or components which are comparable with respect to their function. In the drawings.

DETAILED DESCRIPTION

Figure 1:
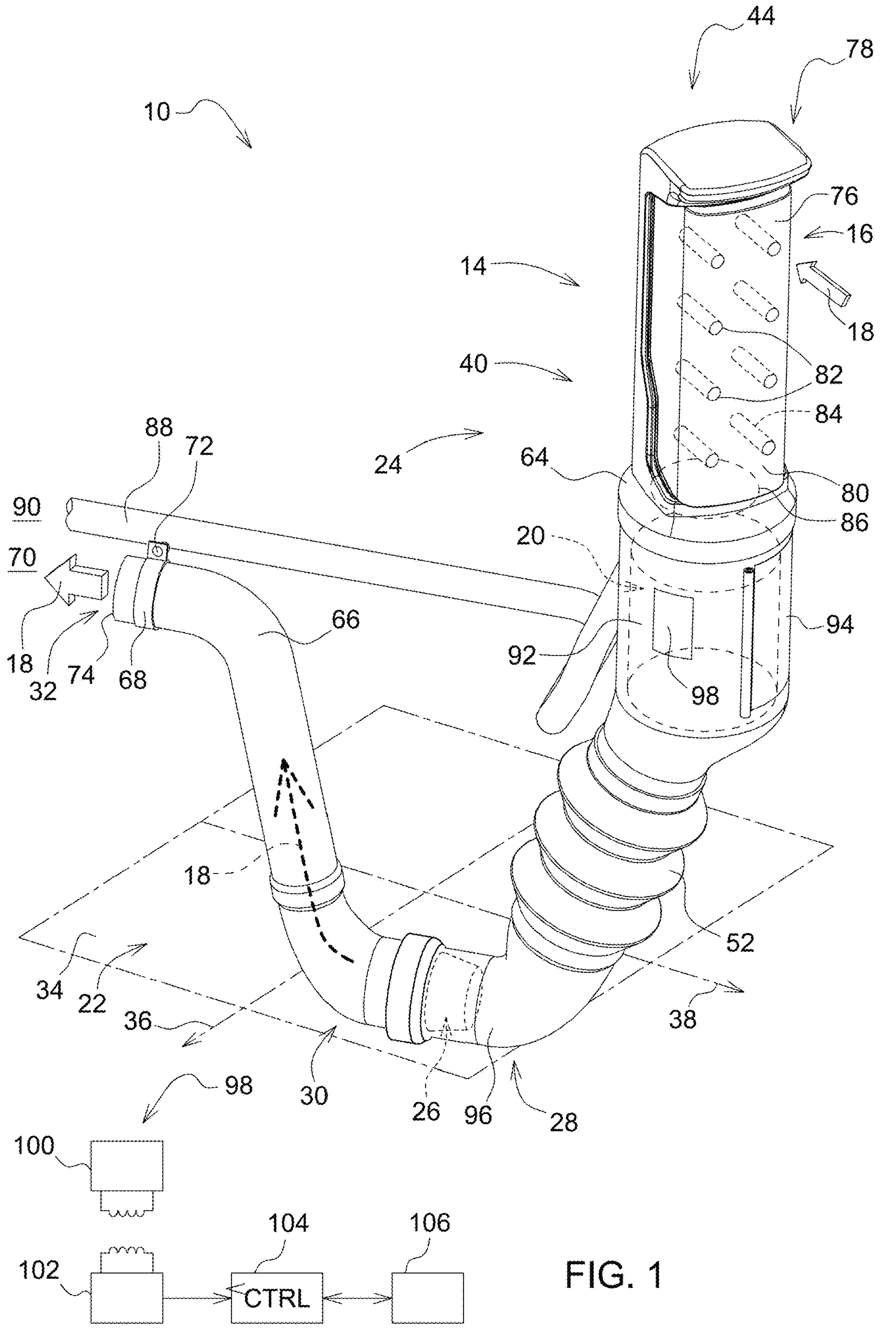
FIG. 1 shows an example embodiment of the air filter assembly according to the disclosure for cleaning an air stream for a commercial vehicle.

FIG. 1 shows an example embodiment of the air filter assembly 10 according to the disclosure, the structure and operating principle of which are intended to be explained below with reference to the installed state, shown in FIG. 2, on a commercial vehicle in the form of an agricultural tractor 12.

The multi-stage air filter assembly 10 comprises a pre-filter 16, which communicates with an air inlet 14, and a first fine filter 20, which is provided downstream of the pre-filter 16 in the direction of an air stream 18 to be cleaned. The first fine filter 20, together with the pre-filter 16, is associated with an air filter portion 24 which extends vertically in a predetermined installation position 22.

The first fine filter 20 is followed in the direction of the air stream 18 to be cleaned by a redundant second fine filter 26. The redundant second fine filter 26 is associated with an air filter portion 28 which extends horizontally in the predetermined installation position 22. The horizontally extending air filter portion 28 is part of a syphon-like line region 30 which rises in a curved manner from the redundant second fine filter 26 toward an air outlet 32 from which the cleaned air stream 18 exits.

Figure 2:
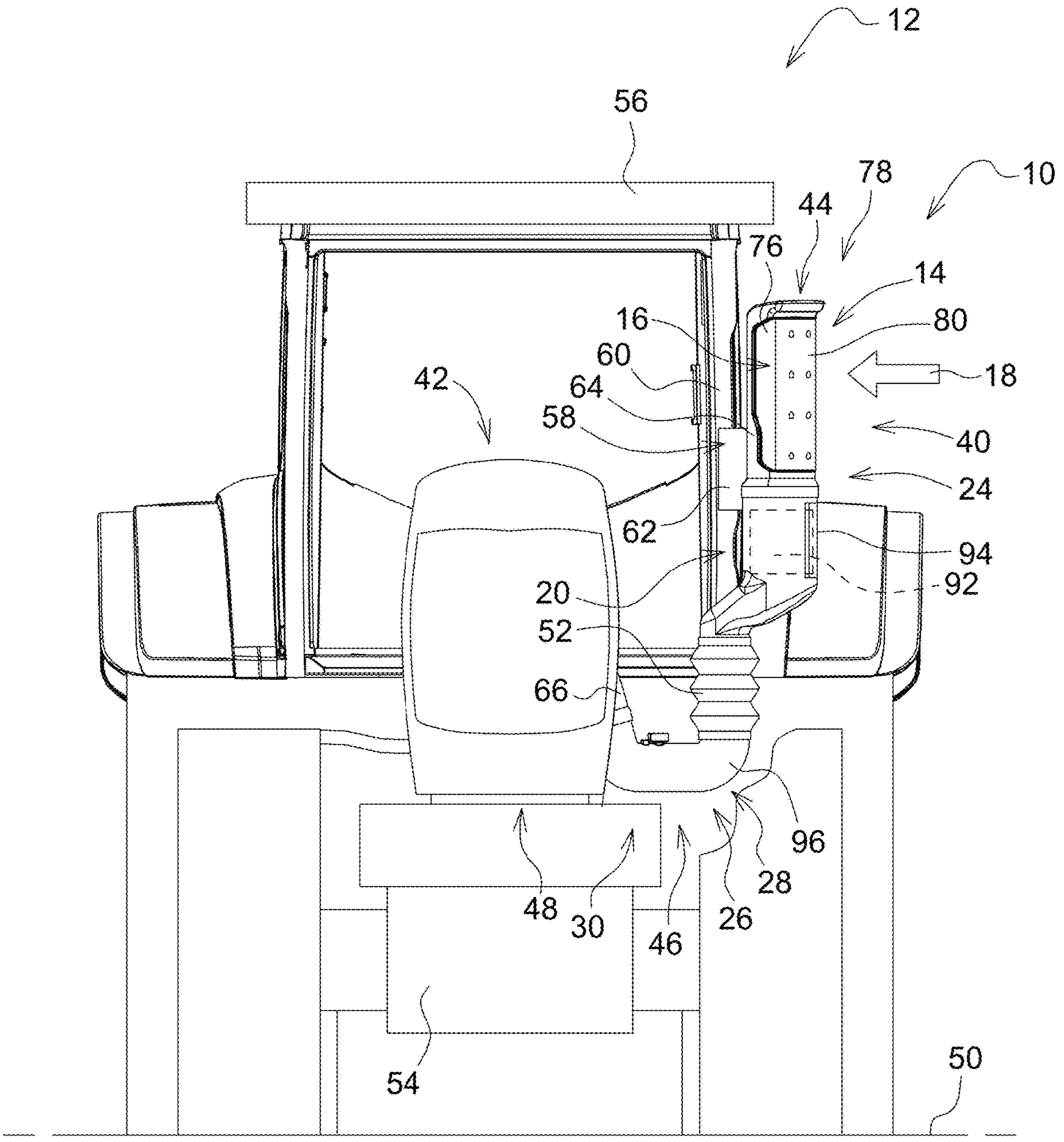
FIG. 2 shows a commercial vehicle in the form of an agricultural tractor, comprising the air filter assembly shown in FIG. 1.

According to FIG. 2, the specification of the installation position 22 of the two air filter portions 24, 28 is based on an imaginary vehicle plane 34 which is spanned by a first axis 36 oriented substantially in the longitudinal direction of the agricultural tractor 12 and a second axis 38 oriented substantially in the transverse direction of the agricultural tractor 12. In relation to this vehicle plane 34, the vertically extending air filter portion 24 is arranged upright and the horizontally extending air filter portion 28 is arranged lying on the agricultural tractor 12.

The actual filtering of the air stream 18 takes place via the pre-filter 16 and the first fine filter 20, therefore these are accommodated together directly following one another in the vertically extending air filter portion 24. The pre-filter 16 and the first fine filter 20 form the main filter 40 of the air filter assembly 10. The redundant second fine filter 26, which is present for reasons of operational reliability, is an additional filter and is therefore situated at a distance from the main filter 40 in the following horizontally extending air filter portion 28.

As can be seen best in FIG. 2, the vertically extending air filter portion 24 is designed by way of example in the form of an intake snorkel 44 situated outside an engine compartment 42 of the agricultural tractor 12, whereas the horizontally extending air filter portion 28 enters the engine compartment 42 laterally in a region 46 below a vehicle unit in the form of an internal combustion engine 48. The use of an intake snorkel 44 here allows the distance between the air inlet 14 and the ground 50 to be increased and thus ambient air having a correspondingly lower dust load to be sucked in.

The vertically extending air filter portion 24 included in the intake snorkel 44 is connected to the horizontally extending air filter portion 28 via a flexible bellows 52. The flexible bellows 52 allows operation-induced movements and vibrations between the two portions 24, 28 to be compensated, for example when the vertically extending air filter portion 24 is attached to a driver's cab 56 spring-suspended relative to a supporting vehicle chassis 54, as is the case here.

To this end, at least one fastening element 58 is provided on the vertically extending air filter portion 24 for mounting on a supporting structure 60 of the driver's cab 56 of the agricultural tractor 12. The fastening element 58 is a holder 62 which is formed integrally on a plastic housing 64 included in the air filter assembly 10 in the region of the intake snorkel 44.

The line region 30 which rises in a curved manner is in the form of an elastic air hose 66. This can include a heat-resistant rubber mixture, for example Viton. A fitting 68 for connection to an intake tract 70 of the internal combustion engine 48 is provided on the air outlet 32. The fitting 68 is formed directly on the elastic air hose 66 as a part of the line region 30 which rises in a curved manner and is mounted air-tightly via a hose clip 72 on a connection flange 74 of the internal combustion engine 48 which communicates with the intake tract 70.

The pre-filter 16 is inserted in the form of a cassette-like insert 76 into the plastic housing 64 in an end region 78 of the intake snorkel 44 so as to be accessible from the outside. The cassette-like insert 76 has a multi-part structure and can be removed manually for the purposes of dismantling and cleaning.

In the present case, the pre-filter 16 is in the form of a centrifugal separator 80 for separating out coarse particles present in the air stream 18 sucked in. The centrifugal separator 80 comprises a plurality of air inlet openings 82, which are adjoined by a respective individual separator 84 which sets the air stream 18 passing through in a swirling motion such that the coarse particles present therein are thrown into a collection region 86 surrounding the individual separators 84 owing to the centrifugal forces which arise.

In order to ensure consistent filter performance, the collection region 86 provided inside the centrifugal separator 80 communicates with a vacuum line 88 for the continuous suction of the coarse particles separated out. The vacuum line 88 opens into an intake region 90 on the low-pressure side of an axial fan assembly (not shown) included in an engine cooling system.

The pre-cleaned air stream 18 exiting from the centrifugal separator 80 is then supplied to the first fine filter 20. To remove dust particles remaining therein, the first fine filter 20 comprises a folded filter nonwoven (not shown) as the active filtering element. During operation, dust particles accumulate therein and can no longer be removed, even by way of cleaning, for example by being blown out with compressed air. To prevent degradation of the filter performance, the first fine filter 20 is therefore in the form of an exchangeable single-use filter cartridge 92. The single-use filter cartridge 92 is situated in an accommodation region, which can be closed air-tightly via a cover 94, inside the plastic housing 64.

The second fine filter 26 arranged in the vertically extending line portion 24 at the same time forms a transition piece 96 which can include plastic and to which the flexible bellows 52 is attached at one end and the elastic air hose 66 is attached at the other end. If required, the transition piece 96 can be removed for the purpose of cleaning or exchanging the second fine filter 26 or an active filtering element arranged therein, wherein, due to gravity, the elastic air hose 66 rising in the direction of the air outlet 32 largely prevents any released dust particles which may have accumulated in this region from passing in the direction of the intake tract 70. To this end, the second fine filter 26 can be situated at the lowest point of the syphon-like line region 30.

In an optional development of the air filter assembly 10, the single-use filter cartridge 92 included in the first fine filter 20 is equipped with an individual identification feature 98 which can be detected by sensors and on the basis of which reuse of the single-use filter cartridge 92 is excluded after a specified useful life has elapsed. The identification feature 98 is an RFID tag 100, which can be read via an RFID receiver 102 on the vehicle. The read identification feature 98 is transmitted to a monitoring unit 104 which determines, on the basis of an operating hour counter started for the single-use filter cartridge 92 in question, whether the specified useful life is exceeded. If this is the case, the monitoring unit 104 prevents the agricultural tractor 12 from being put back into operation while outputting corresponding information for the driver. The latter takes place via a user interface 106 which is connected to the monitoring unit 104 and is situated in the driver's cab 56 of the agricultural tractor 12.

The invention claimed is:

1. An air filter assembly for cleaning an air stream for a commercial vehicle, comprising:

a pre-filter, which communicates with an air inlet; and a first fine filter, which is provided downstream of the pre-filter in the direction of the air stream and, together with the pre-filter, is associated with an air filter portion which extends vertically in a predetermined installation position;

wherein the first fine filter is followed in the direction of the air stream by a redundant second fine filter, which is associated with an air filter portion which extends horizontally in the predetermined installation position;

wherein the horizontally extending air filter portion is part of a syphon-like line region which rises in a curved manner from the redundant second fine filter toward an air outlet.

2. The air filter assembly of claim 1, wherein the pre-filter is in the form of a centrifugal separator for separating out coarse particles present in the air stream.

3. The air filter assembly of claim 2, wherein a collection region provided inside the centrifugal separator communicates with a vacuum line for the continuous suction of the coarse particles separated out.

4. The air filter assembly of claim 1, wherein the vertically extending air filter portion is connected to the horizontally extending air filter portion via a flexible bellows.

5. The air filter assembly of claim 1, wherein at least one fastening element is provided on the vertically extending air filter portion for mounting on a supporting structure of a driver's cab of the commercial vehicle.

6. The air filter assembly of claim 1, wherein the first fine filter comprises a folded filter nonwoven as the active filtering element.

7. The air filter assembly of claim 1, wherein the first fine filter is in the form of an exchangeable single-use filter cartridge.

8. The air filter assembly of claim 7, wherein the single-use filter cartridge is equipped with an individual identification feature which can be detected by sensors.

9. The air filter assembly of claim 1, wherein the line region (30) which rises in a curved manner is in the form of an elastic air hose.

10. The air filter assembly of claim 1, wherein a fitting for connection to an intake tract of a vehicle unit in the form of an internal combustion engine is provided on the air outlet.

* * * * *